United States Patent [19]

Preston et al.

[11] 4,062,011
[45] Dec. 6, 1977

[54] MTI SYSTEM PROCESSOR AND METHOD

[75] Inventors: Glenn W. Preston, Rosemont, Pa.; Walter H. Chudleigh, Jr., Golden Valley, Minn.; William G. Ehrich, Geneva, Switzerland

[73] Assignee: Control Data Corporation, Minneapolis, Minn.

[21] Appl. No.: 282,073

[22] Filed: Aug. 21, 1972

[51] Int. Cl.² .............................................. G01S 9/42
[52] U.S. Cl. ..................................... 343/7 A; 343/7.7
[58] Field of Search ................................. 343/7 A, 7.7

[56] References Cited

U.S. PATENT DOCUMENTS

| 3,341,847 | 9/1967 | Fried et al. | 343/7.7 X |
| 3,346,859 | 10/1967 | Mullins et al. | 343/7.7 |
| 3,611,369 | 10/1971 | Maguire | 343/7 A |
| 3,706,989 | 12/1972 | Taylor | 343/7 A |
| 3,707,718 | 12/1972 | Ames | 343/7.7 |
| 3,721,978 | 3/1973 | Doggett | 343/7 A |
| 3,737,900 | 6/1973 | Vehrs | 343/7.7 X |
| 3,806,924 | 4/1974 | Applebaum | 343/7.7 |
| 3,903,525 | 9/1975 | Mullins et al. | 343/7.7 |
| 3,952,302 | 4/1976 | Mullins | 343/7.7 |

*Primary Examiner*—T.H. Tubbesing

*Attorney, Agent, or Firm*—Burns, Doane, Swecker & Mathis

[57] ABSTRACT

A method and apparatus for removing the effects of radar platform movement and for otherwise processing doppler radar signals in a moving target indicator doppler radar in which targets in the main beam having reflective characteristics sufficient to override side lobe attenuation are tracked relative to the side lobes and the residual doppler frequency for such targets resulting from side lobe detection calculated. Based on this calculation, the appropriate ones of a bank of doppler filters are inhibited at the appropriate range bin to prevent a false target indication without inhibiting the display of moving targets in the main beam at the same range but having different doppler frequencies. A novel automatic gain control circuit which provides dynamic amplitude adjustment of the radar return signal to match the dynamic range of the radar processor on a range bin-by range bin basis is also provided as is a novel signal processing circuit for removing the effects of radar platform movement from the radar return signal. The use of a sensitivity time control is disclosed as is the method of vector rotation and quadrant resolution.

11 Claims, 10 Drawing Figures

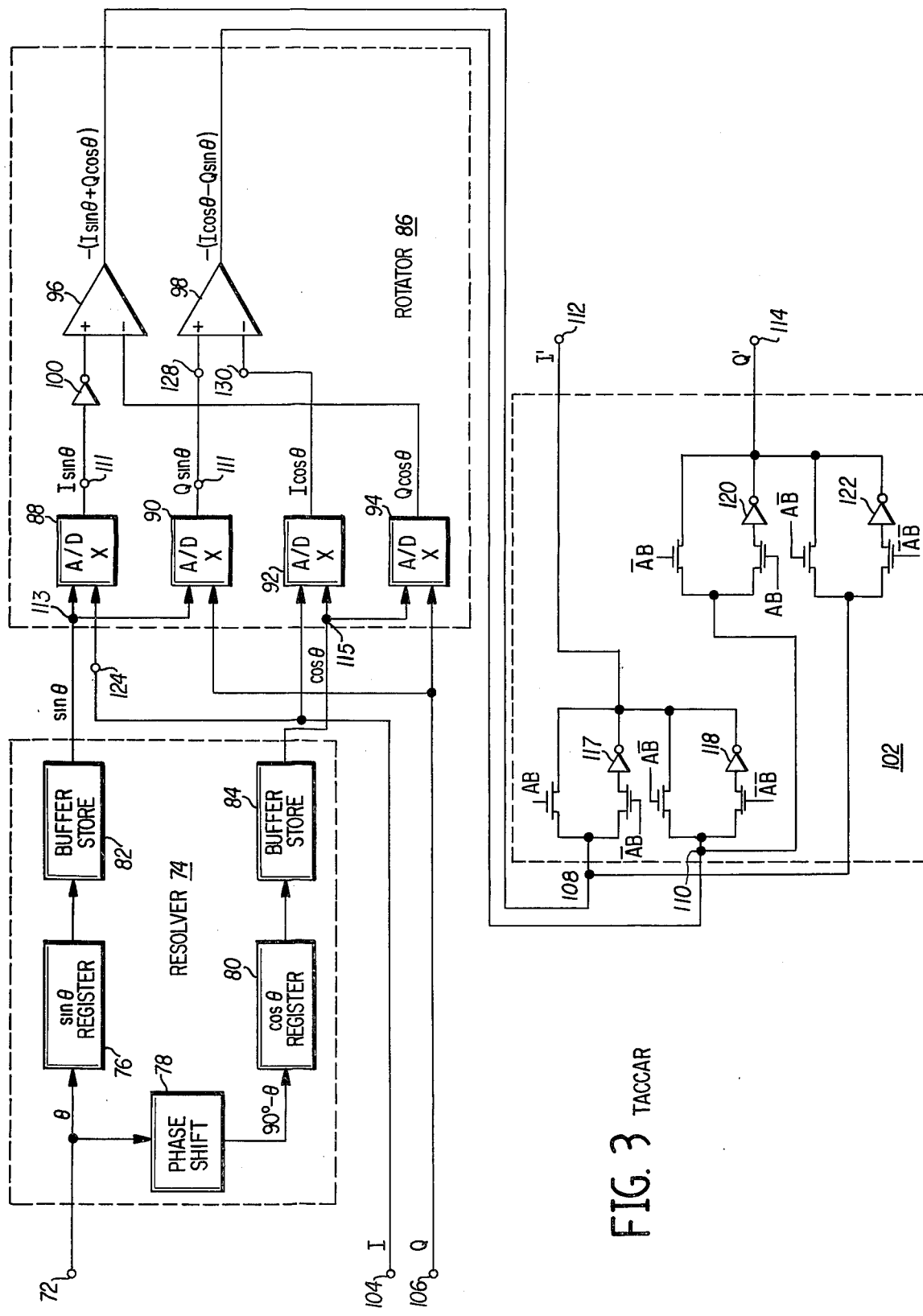
FIG. 3 TACCAR

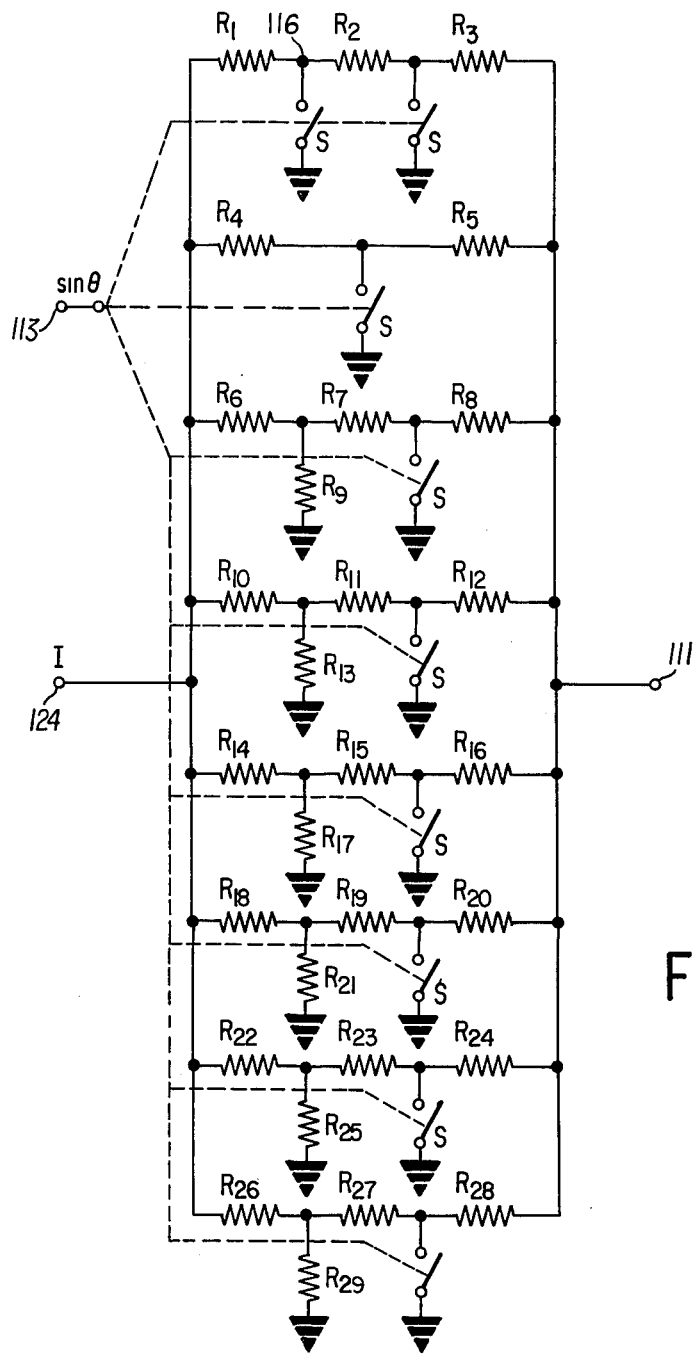
FIG. 4 A/D MULTIPLIER

OP. AMP.

4,062,011

MTI SYSTEM PROCESSOR AND METHOD

BACKGROUND OF THE INVENTION

The present invention relates to a signal processor for a moving target indicator and more specifically, to the method of removing the effects of radar platform movement in such systems.

Background material relevant to an understanding of the present invention may be found in the copending applications Ser. No. 278,479 of Walter H. Chudleigh, Jr. entitled "Automatic Gain Control Circuit and Method" and Ser. No. 278,478 of Walter H. Chudleigh, Jr. entitled "MTI System and Method", both of said applications being filed concurrently herewith, assigned to the assignee of the present invention, and hereby incorporated herein by reference.

It is an object of the present invention to provide an automatic gain control system which permits simplification of the radar processor.

It is a further object of the present invention to provide a novel method and apparatus for removing the effects of radar platform movement from doppler radar return signals.

It is yet another object to provide a novel method and apparatus for processing doppler radar signals.

It is still a further object of the present invention to provide a novel method and apparatus for vector rotation.

These and other objects and advantages of the present invention will be readily apparent to one skilled in the art to which the invention pertains from a perusal of the claims and the following detailed description when read in conjunction with the appended drawings.

THE DRAWINGS

FIG. 3 is a functional block diagram of the TACCAR unit of FIG. 1;

FIG. 4 is a schematic circuit diagram of the analog-to-digital multipler of FIG. 3;

THE DETAILED DESCRIPTION

The present invention may be more readily understood by reference to the detailed description as set out in accordance with the following table of contents:

TABLE OF CONTENTS

I. MTI System (FIGS. 1 and 2)
II. TACCAR (FIGS. 3-7)
  A. Circuit (FIGS. 3-6)
  B. Operation (FIG. 7)
III. Processor (FIGS. 8-10)
  A. Double Loop Canceller (FIG. 8)
  B. Double Loop Canceller Operation
  C. Single Loop Canceller and Operation (FIG. 7)
  D. Memory and Filter Circuits (FIGS. 9 and 10)
IV. Advantages and Scope of Invention

I. MTI System

Figure 1:
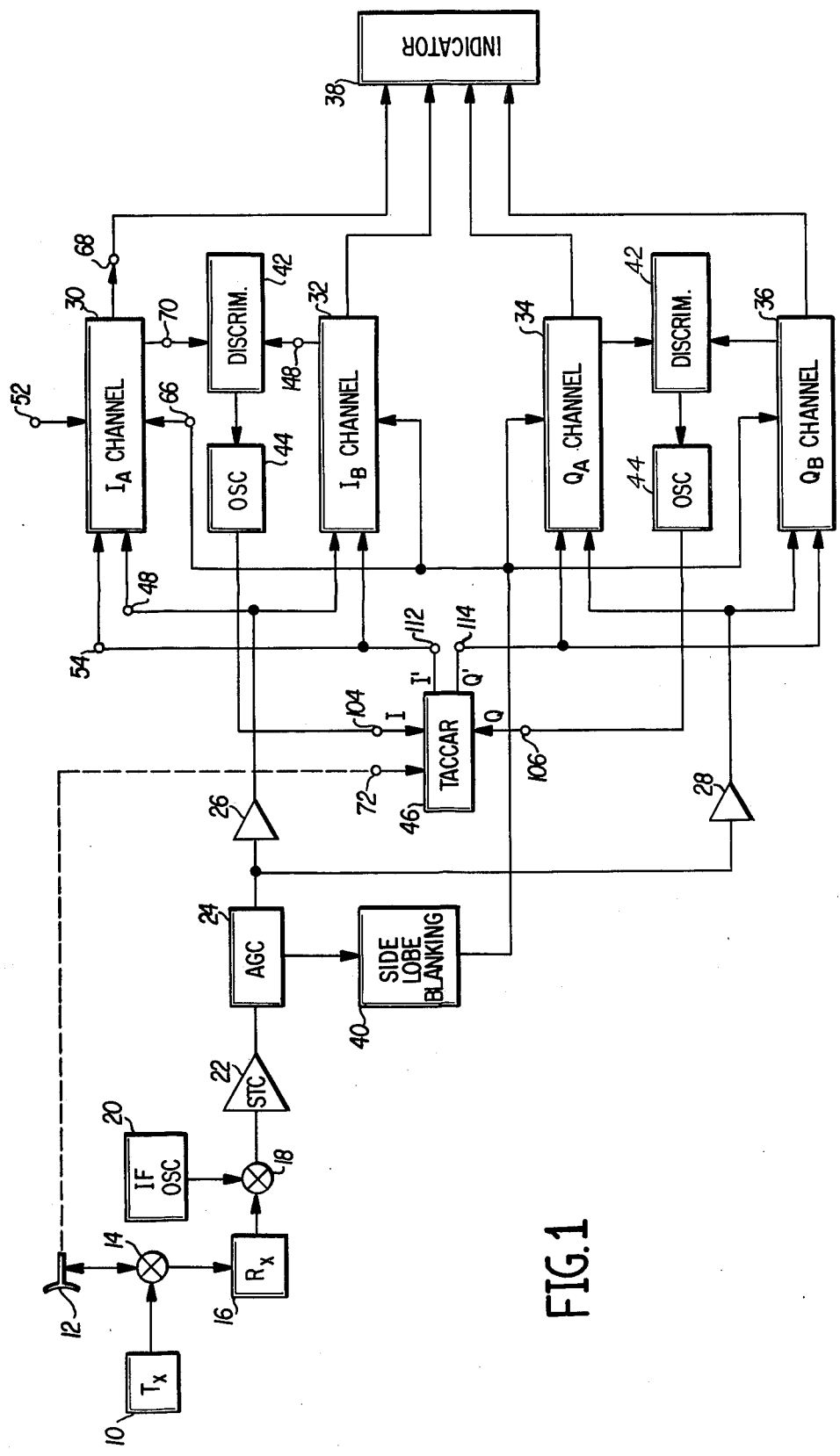
FIG. 1 is a functional block diagram of the system of the present invention.

With reference now to the system diagram of FIG. 1, radar pulses from a transmitter 10 are applied to an antenna 12 by way of a TR switch 14 and the reflected radar energy received by the antenna 12 is applied by way of the TR switch 14 to a receiver 16. The raw radar signal from the receiver 16 is heterodyned in a mixer 18 with the signal from an IF oscillator 20 and the IF output signal therefrom applied through a sensitivity time control (STC) circuit 22 to an automatic gain control circuit 24.

The antenna 12, transmitter 10, receiver 16 and TR switch 14 are conventional in the art as is the heterodyning of the raw radar return signal with the output signal from the IF oscillator 20 to produce an IF radar signal, desirably 30 MHz. The sensitivity time control circuit 22 is also conventional in the art and is operable to control the gain of an amplifier associated therewith as a function of average ground clutter, i.e., the reciprocal of range raised to the fourth power, i.e., $1/R^4$. The automatic gain control circuit 24 may be of the type disclosed and claimed in the copending application. Ser. No. 278,478, filed concurrently herewith by Walter H. Chudleigh entitled "MTI System and Method". Said application Ser. No. 278,478 is assigned to the assignee of the present invention and the disclosure thereof is herein and hereby incorporated by reference.

The output signal from the automatic gain control circuit 24 is amplified in one of two amplifiers 26 and 28 and applied to each of four channels 30–36 for processing. The four channels 30–36 relate respectively to two samples of the in-phase signal components and two samples of the quadrature signal components as will hereinafter be more fully explained. These four channels 30–36 are identical in circuitry and operation and only one channel, that of the first sample $I_A$ of the in-phase signal, will be subsequently described in detail in connection with FIG. 2.

With continued reference to FIG. 1 and as will hereinafter be explained, the $I_A$ channel 30 comprises a sample and hold, canceller, memory, and doppler filter summing circuits as well as a plurality of serially connected blanking gates. The output signal passed through the blanking gates is applied to an appropriate conventional indicator 38 together with the output signals passed through the blanking gates of the other three signal channels $I_B$, $Q_A$ and $Q_B$.

The output signal from the automatic gain control circuit 24 may also be applied to a side lobe blanking circuit 40 which controls the operation of the blanking gates 38 associated with each of the four channels 30–36. The side lobe blanking circuit 40 is claimed and described in detail in the aforementioned copending application and reference may be had thereto.

An output signal from one of the canceller circuits of the $I_A$ and $I_B$ channels 30 and 32 is applied by way of a discriminator 42 and phase deviable oscillator 44, to a time averaged clutter coherent airborne radar (TACCAR) circuit 46 and the output signal therefrom summed with the output signal from the sample and hold circuit in each of the channels 30-36 to remove the effects of radar platform movement from the doppler phase shift detected by the antenna 12. The discriminator 42 and phase deviable oscillator 44 are described in more detail as part of the TACCAR circuit hereinafter described in connection with FIGS. 3-7.

The operation of the $I_A$, $I_B$, $Q_A$ and $Q_B$ channels 30-36 is hereinafter described infra in greater detail in connection with FIGS. 8 and 9.

Figure 2:
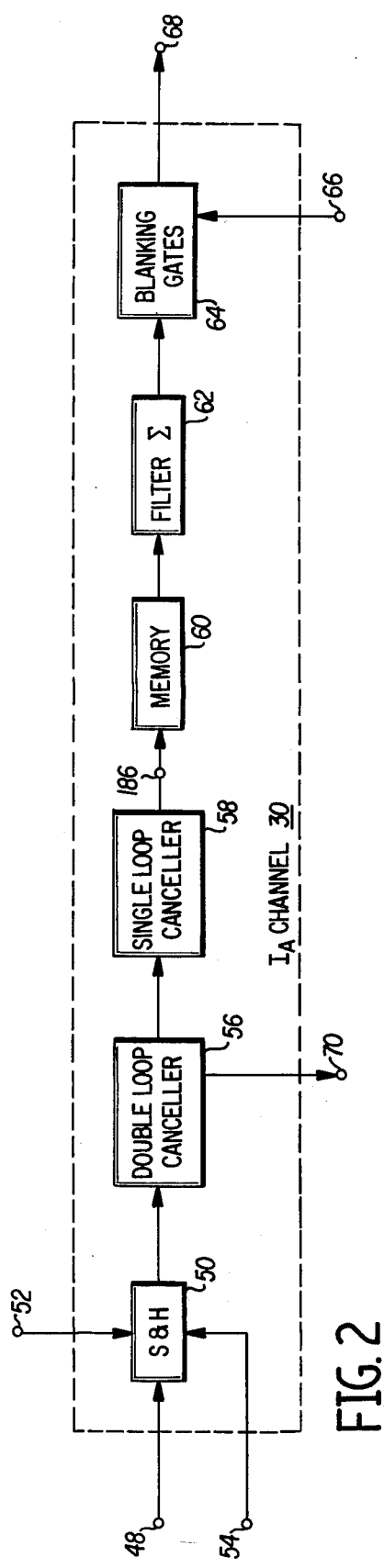
FIG. 2 is a more detailed block diagram of the $I_A$ channel of the system of FIG. 1.

With reference now to FIG. 2 where the $I_A$ channel 30 of FIG. 1 is illustrated in greater detail, the output signal from the amplifier 26 is applied by way of an input terminal 48 to a conventional sample and hold circuit 50 to which a clock signal is also applied from an input terminal 52 of a conventional clock (not shown). The output signal from the TACCAR circuit 60 of FIG. 1 is also applied by way of an input terminal 54 to the sample and hold circuit 50.

The output signal from the sample and hold circuit 50 is applied through a double loop canceller 56 and a single loop canceller 58, both conventional in circuitry and operation, to a memory 60 hereinafter described in greater detail in connection with FIG. 3. The output signal from the memory 60 is fed through a bank of doppler summing filters 62 and applied to the bank of blanking gates 64 earlier referenced which also receive the output signal from the side lobe blanking circuit 40 of FIG. 1 by way of an input terminal 66.

The output signal from the blanking gates 64 is applied to the indicator 38 of FIG. 1 by way of an output terminal 68. The other output signal from the $I_A$ channel 30 of FIG. 2 is the signal taken from the double loop canceller 56 and applied to the discriminator 42 of FIG. 1 by way of an output terminal 70.

II. TACCAR

A. Circuit

With reference now to FIG. 3 wherein the resolver and rotator of the TACCAR circuit 46 of FIG. 1 are illustrated in greater detail, the raw analog signal $\theta$ from a conventional source (not shown) is indicative of the angle of the radar antenna 12 of FIG. 1 relative to the direction of movement of the antenna and is applied to an input terminal 72 of the resolver 74 from which it is directly applied to a sin $\theta$ register 76 and through a suitable conventional phase shift circuit 78 as a 90° $-\theta$ signal to a cos $\theta$ register circuit 80. The sine and cosine register circuits 76 and 80 may comprise conventional read only memories such as the Philco Model PM-1024C. These memories serve as sine and cosine look-up tables and provide an 8-bit digital word indicative of the value of the trigometric function and the quadrant. These 8-bit digital sine and cosine words are stored respectively in conventional buffer stores 82 and 84 prior to application to the rotator 86.

As indicated in FIG. 3, the rotator 86 basically comprises four analog/digital multipliers 88-94, two high-speed operational amplifiers 96 and 98 and an inverter 100. The 8-bit digital sin $\theta$ and cos $\theta$ output signals from the buffer stores 82 and 84 are applied respectively to the analog/digital multipliers 88 and 90, and to the multipliers 92 and 94. The multipliers 88 and 92 and the multipliers 90 and 94 also receive, respectively, the in-phase and quadrature video components I and Q of the 30 MHz. IF radar signal from the phase deviable oscillators 44 of FIG. 1 by way of input terminals 104 and 106. The analog output signal I sin $\theta$ from the analog/digital multiplier 88 is inverted in the conventional inverter 100 and applied to the positive input terminal of the differential amplifier 96 as an analog $-I \sin \theta$ signal. The analog Q cos $\theta$ signal from the multiplier 94 is applied to the negative input terminal of the amplifier 96 and the analog $-(I \sin \theta + Q \cos \theta)$ output signal therefrom is applied to a quadrant selector circuit 102 subsequently to be described.

In a like manner, the Q sin $\theta$ signal and I cos $\theta$ signals are applied, respectively, from the analog/digital multipliers 90 and 92 to the positive and negative input terminals of the differential amplifier 98 to produce an analog $-(I \cos \theta - Q \sin \theta)$ signal for application to the quadrant selector 102.

The multiplication process is accomplished with at least 8-bit processes requiring that the d.c. offset variation be less than 4 milivolts over a temperature range of 0°-150° F. The analog/digital multipliers 88-94 will be described in greater detail in connection with FIGS. 4 and 5 and the operational amplifiers 96 and 98 will be subsequently described in more detail in connection with FIG. 6. The operational amplifiers 96 and 98 have rise and fall times, respectively, of 20 and 22 nanoseconds which is compatible with the 200 nanosecond interval modification of the analog video input signal from the sample and hold circuits 50 of FIG. 1.

With continued reference to FIG. 3, the quadrant selector 102 comprises four identical circuits, each including two field effect transistors in parallel between the quadrant selector input terminal 108 or 110 and the output terminals 112 or 114. One of the parallel paths of each of the four circuits includes a conventional inverter 117, 118, 120 or 122 and the output signals from the four circuits are summed in pairs to provide the I' and Q' output signals of the TACCAR circuit respectively on the output terminals 112 and 114.

The eight field effect transistors in the quadrant selector 102 are rendered conductive by the application of a quadrant indicative 2-bit digital signal in which the two bits A and B from a conventional source (not shown) are set out in the following table:

TABLE 1

| Quadrant | Sign A | Bits B | I' and Q' |
|---|---|---|---|
| I | 0 | 0 | I' = I cos Θ − Q sin Θ |
|   |   |   | Q' = Q cos Θ + I sin Θ |
| II | 0 | 1 | I' = I sin Θ + Q cos Θ |
|   |   |   | Q' = Q sin Θ − I cos Θ |
| III | 1 | 0 | I' = −I cos Θ + Q sin Θ |
|   |   |   | Q' = −Q cos Θ − I sin Θ |
| IV | 1 | 1 | I' = −I sin Θ − Q cos Θ |
|   |   |   | Q' = −Q sin Θ + I cos Θ |

The functions illustrated in TABLE 1 above are for a counterclockwise rotating antenna in which the sign associated with the sine function defines the direction of steering of the antenna. For a clockwise rotating antenna, the inverter 100 in FIG. 3 would have to be connected between the output terminal 111 of the A/D converter 90 and the input terminal 128 of the amplifier 98.

Figure 5:
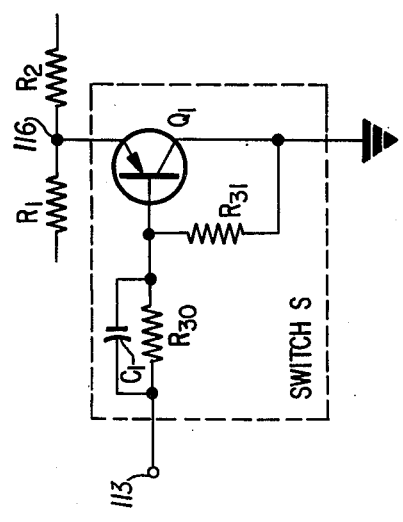
FIG. 5 is a schematic circuit diagram of the switch of FIG. 4.

The analog/digital multiplier 88 illustrated in block form in FIG. 3 is illustrated in greater detail in FIGS. 4 and 5. With reference now to FIG. 4, the analog input signal I is applied to an input terminal 124 of a resistance ladder network of eight parallel branches. Each branch of the resistance ladder network contains three resistors in series with the interconnections therebetween selectively grounded through a switch S or through a resistor having a predetermined value. Typical values for the various resistors for the ladder network of FIG. 4 are as follows:

TABLE II

| Resistor | Value |
|---|---|
| $R_1$ | 2610 ohms |
| $R_2$ | 1580 ohms |
| $R_3$ | 2610 ohms |
| $R_4, R_7, R_{11}, R_{15}, R_{19}, R_{23},$ and $R_{27}$ | 3.4 K ohms |
| $R_5, R_8, R_{12}, R_{16}, R_{20}, R_{24},$ and $R_{28}$ | 10.2 K ohms |
| $R_6$ | 348 ohms |
| $R_9$ | 357 ohms |
| $R_{10}$ | 716 ohms |
| $R_{13}$ | 243 ohms |
| $R_{14}$ | 402 ohms |
| $R_{17}$ | 57.6 ohms |
| $R_{18}$ | 1070 ohms |
| $R_{21}$ | 71.5 ohms |
| $R_{22}$ and $R_{26}$ | 1540 ohms |
| $R_{25}$ and $R_{29}$ | 49.9 ohms |

The switch S illustrated schematically in FIG. 4 may be of the type illustrated in FIG. 5. Referring now to FIG. 5, the interconnection 116 between the resistors $R_1$ and $R_2$ may be directly connected to the emitter electrode of a PNP transistor $Q_1$ having a grounded collector electrode. The base electrode of the transistor $Q_1$ is isolated from ground potential by a resistor $R_{31}$ and receives, by way of a resistor $R_{30}$ and capacitor $C_1$ in parallel, one of the eight bits of the digital word indicative of sine values as derived from the output terminal 113 of the resolver circuit 74 of FIG. 3.

The analog/digital multipliers 90-94 of FIG. 3 may also be of the type illustrated in FIGS. 4 and 5 with the application of a Q signal from terminal 106 and the application of the 8-bit digital word indicative of cosine values from the terminal 115 of the buffer store 84 as appropriate and as indicated in FIG. 3. To avoid redundancy, these circuits will not be further described.

In operation and with reference again to FIG. 4, the removal of a positive signal from the input terminal 113 will render the appropriate transistor $Q_1$ conductive providing a path from the resistor $R_1$-resistor $R_2$ junction 116 to ground and thus removing the effect of the resistors in that branch of the ladder network.

Typical circuit values for the components of the circuit of FIG. 5 are as follows:

TABLE III

| Component | Value |
|---|---|
| Resistor $R_{30}$ | 5.6 K ohms |
| Resistor $R_{31}$ | 1.8 K ohms |
| Capacitor $C_1$ | 100 microfarads |
| Transistor $Q_1$ | Type 2944 |

Figure 6:
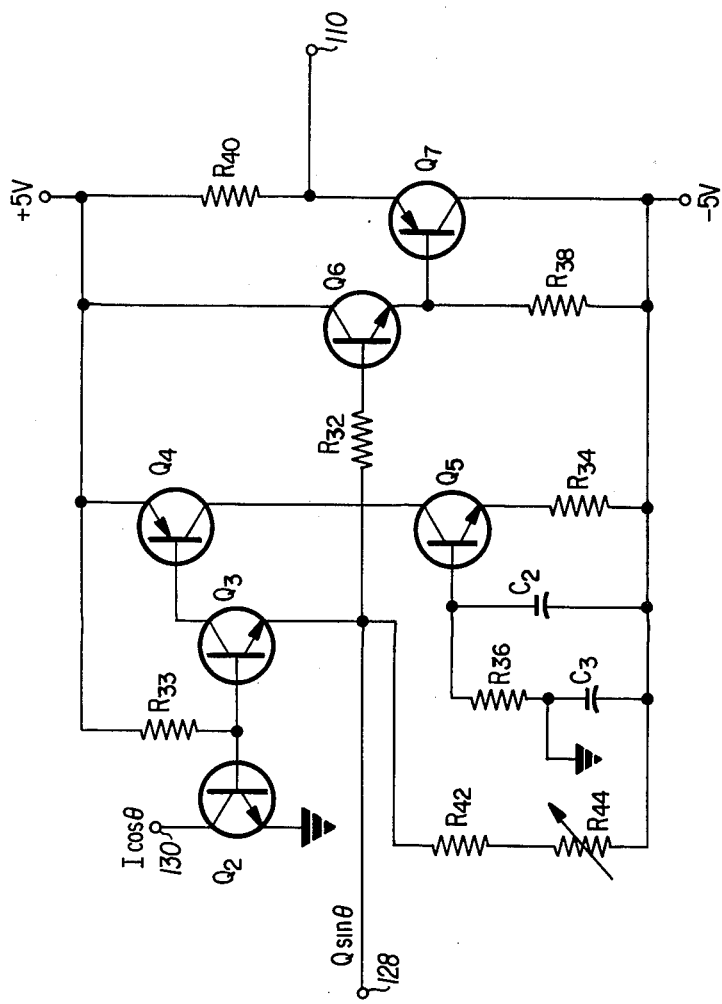
FIG. 6 is a schematic circuit diagram of the operational amplifier of FIG. 3.

The operational amplifier 98 illustrated in the circuit of FIG. 3 is illustrated in greater detail in FIG. 6 wherein the output signal from the analog/digital multiplier 90 is applied by way of an input terminal 128 directly to the emitter electrode of an NPN transistor $Q_3$ and through a resistor $R_{32}$ to the base electrode of an NPN transistor $Q_6$. Bias for the base electrode of the transistor $Q_3$ is provided from a 5 volt source of positive potential through a resistor $R_{33}$ and the base to the emitter path of a grounded emitter NPN transistor $Q_2$. The collector electrode of transistor $Q_2$ is directly connected to the output terminal 130 of the analog-to-digital multiplier 92 to receive therefrom the I cos $\theta$ signal.

The collector electrode of the transistor $Q_3$ is directly connected to the base electrode of a PNP transistor $Q_4$. The emitter electrode of the transistor $Q_4$ is directly connected to the 5 volt source of positive potential and the collector electrode thereof is directly connected to the collector electrode of a complementary transistor $Q_5$. The emitter electrode of the transistor $Q_5$ is connected to a 5 volt source of negative potential through a resistor $R_{34}$. The base electrode of the transistor $Q_5$ is grounded through a resistor $R_{36}$ and through a capacitor $C_2$ to the 5 volt source of negative potential.

The emitter electrode of the transistor $Q_3$, i.e. the input terminal 128, is connected through a resistor $R_{42}$ and a potentiometer $R_{44}$ to the negative 5 volt source and, as earlier stated, also connected through the resistor $R_{32}$ to the base electrode of the transistor $Q_6$. The emitter electrode of the transistor $Q_6$ is connected through a resistor $R_{38}$ to the 5 volt source of negative potential and is also directly connected to the base electrode of a PNP transistor $Q_7$. The collector electrode of the transistor $Q_7$ is directly connected to the 5 volt source of negative potential and the emitter electrode thereof is connected through a resistor $R_{40}$ to the 5 volt source of positive potential. The collector electrode of the transistor $Q_6$ is also directly connected to the positive 5 volt source. The output signal taken from the emitter electrode of the transistor $Q_7$ is the output signal of the operational amplifier 98 and is applied to the input terminal 110 of the quadrant selector 102.

Typical values for the components of the operational amplifiers 96 and 98 of FIGS. 3 and 6 are as follows:

TABLE IV

| Component | Value |
|---|---|
| Transistors $Q_2$ and $Q_3$ | Type 3646 |
| Transistors $Q_4$ and $Q_5$ | Type 986 F |
| Transistors $Q_6$ and $Q_7$ | Type 986 |
| Resistor $R_{32}$ | 3.3 K ohms |
| Resistor $R_{33}$ | 27 K ohms |
| Resistor $R_{34}$ | 10 K ohms |
| Resistor $R_{36}$ | 100 K ohms |
| Resistors $R_{38}$ and $R_{40}$ | 470 K ohms |
| Resistor $R_{42}$ | 22 K ohms |
| Potentiometer $R_{44}$ | 0-50 K ohms |
| Capacitor $C_2$ | 100 picofarads |
| Capacitor $C_3$ | 0.01 picofarads |

By means of the circuit described supra, the video components of the 30 MHz. IF signal are rotated through an angle $\beta$ which represents the equivalent rotation generated by the frequency discriminator 42 of the circuit of FIG. 1. The logic for obtaining the I' and Q' signals appropriate for the correct quadrant is understood more easily in connection with FIG. 7.

Figure 7:
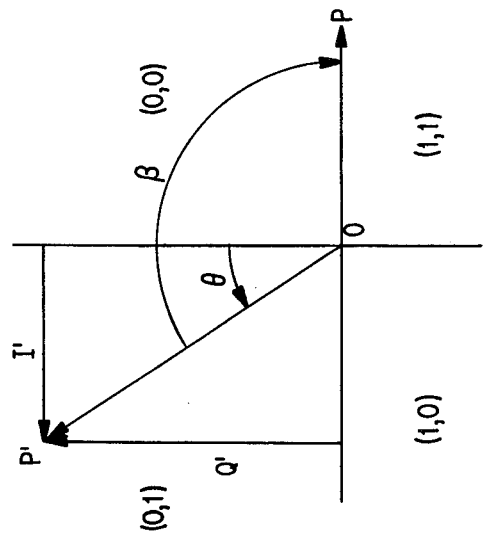
FIG. 7 is a polar plot of the radar platform movement illustrating the operation of the TACCAR unit of FIG. 3.

With reference now to FIG. 7, assume that the initial vector is $\overrightarrow{OP}$ and that the vector $\overrightarrow{OP'}$ is to be rotated through an angle $\beta$. The in-phase component $\overrightarrow{I'}$ may be represented by the equation:

$$\overrightarrow{I'} = I \cos \theta - Q \sin \theta \qquad (1)$$

and the quadrature component by the equation:

$$\overrightarrow{Q'} = Q \cos \theta + I \sin \theta \qquad (2)$$

The output signal from the phase deviable oscillator 44 of FIG. 1 gives the angle $\theta$ in a 7-bit digital word in which the last two bits specify the quadrant. $\overrightarrow{I'}$ and $\overrightarrow{Q'}$ may thus be given in terms of cos $\theta$ and sin $\theta$ in dependency upon the quadrant specified by the phase deviable oscillator in accordance with Table I, earlier described.

III. PROCESSOR

A. Double Loop Cancellers

Figure 8:
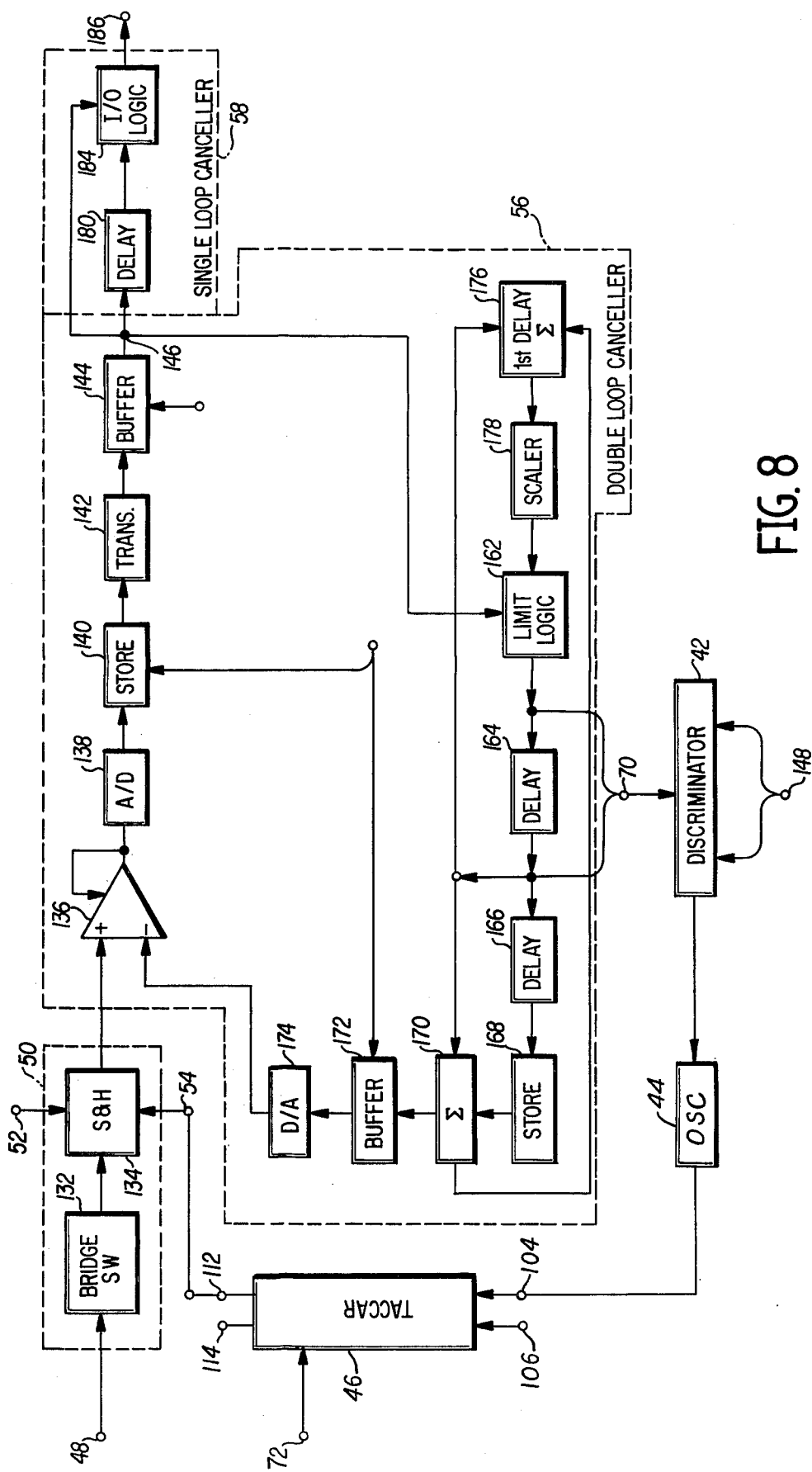
FIG. 8 is a functional block diagram of the signal processor of FIG. 2.

With reference now to FIG. 8 wherein a portion of the I$_4$ channel of FIG. 2 is illustrated in greater detail, the sample and hold circuit 50 of FIG. 2 comprises a conventional bridge switch 132 and a sample and hold circuit 134 sampled at a 30 MHz. rate by signals applied to an input terminal 152 from a conventional clock source (not shown).

The double loop canceller 56 of FIG. 2, as illustrated in FIG. 8, comprises a serially connected differential operational amplifier 136, a 6-bit analog-to-digital converter 138, a holding register or store 140, a translator 142, and a buffer 144. The output signal from the buffer 144 is the output signal from the double loop canceller 56. This output signal is applied by way of a terminal 146 to a limit logic circuit 162 and the output signal therefrom is applied through a pair of serially connected delay circuits 164 and 166 to an incremental clocked delay storage circuit 168. The output signals from the delay storage circuit 168 are summed with the output signal from the first delay circuit 164 in an output adder or summmation circuit 170 and the output signal therefrom applied through a buffer circuit 172 and an 8-bit digital-to-analog converter 174 to the negative input terminal of the differential operational amplifier 136.

The limit logic circuit 162 is a conventional circuit for preventing a scaler value from resetting upon the attainment of a maximum value thus holding the scaler value at its maximum.

The output signal from the summing circuit 170 is also applied, together with the output signal from the first delay circuit 164, to a first delay summation circuit 176. The output signal from the summation circuit 176 is scaled in a conventional scaler 178 and applied to the logic limit circuit 162.

Thus, the output signal from the buffer 144, i.e., the double loop canceller 56 output signal, is applied by way of the limit logic circuit 162 to the delay circuits 164 and 166 for a delay of one interpulse period, e.g., about 250 miles. The output signal from the delay circuit 166 is then summed in the summation circuit 170 with signals previously stored from the store 168. This signal from the delay circuit 164 is also summed with the output signal of the summation circuit 170 in the first delay summation circuit 176 for scaling and reapplication to the limit logic circuit 162.

With continued reference to FIG. 8, the output signals from the limit logic circuit 162 and the delay circuit 164 are also applied to the discriminator 42 of FIG. 1 by way of the collective terminal 70. The discriminator 42 also receives similar input signals from the double loop canceller of the I$_B$ channel 32 by way of the collective terminal 148. The output signal from the discriminator 42 is utilized to control the phase of the output signal from the phase deviable oscillator 44 which, by means of the TACCAR circuit earlier described in connection with FIGS. 3–6, is applied to the positive input terminal of the differential operational amplifier 136 to remove the effects of radar platform movement from the doppler phase shift of the radar signals detected by the antenna 12 of FIG. 1.

With continued reference to FIG. 8, the output signal from the double loop canceller 56 is applied by way of the terminal 146 to the single loop canceller 58. The canceller 58 comprises a delay circuit 180 and an input-/output logic circuit 184 connected in series. The input-/output logic circuit 184 also receives directly from the terminal 146 the output signal from the double loop canceller 56. The output signal from the input/output logic circuit 184 is the output signal from the single loop canceller and is applied through the memory 60 of FIG. 2 by way of a terminal 186.

The input/output logic circuit 184 is a difference circuit for supplying an output signal representative of the difference between the contents of the buffer 144 and the output signal from the delay circuit 180.

Figure 9:
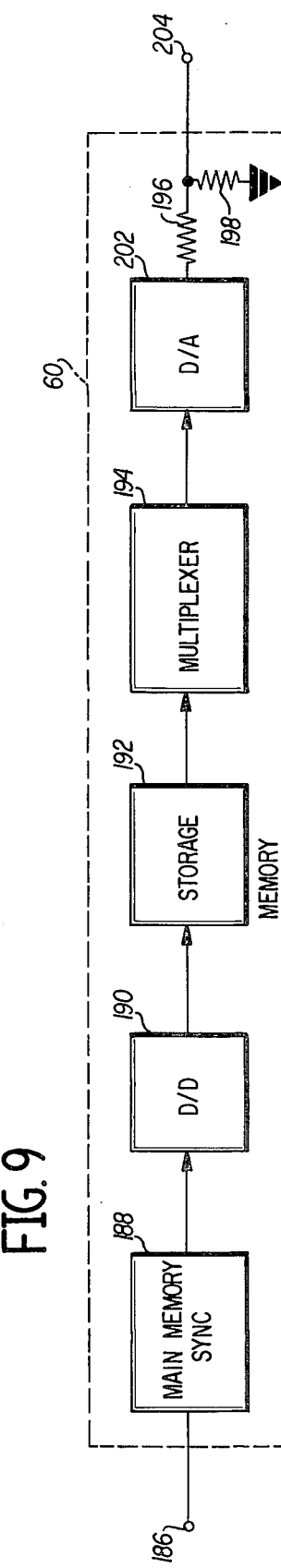
FIG. 9 is a functional block diagram of the memory circuit of FIG. 2.

With reference to FIG. 9 wherein the memory circuit 60 of the I$_4$ channel 30 of FIG. 2 is illustrated in greater detail, the output signal from the 4-bit input/output logic circuit 184 of FIG. 8 is applied to a serially connected main memory sync circuit 188, a digital-to-digital converter 190, a storage circuit 192 including a plurality of memory cards, a multiplexer 194, a 4-bit digital-to-analog converter 202, and a Chebycheff weighting circuit including resistors 196 and 198.

The output signal from the memory circuit 60 is the output signal from the digital-to-analog converter 202 as weighed and is applied by way of a terminal 204 to the doppler filter summing circuit 62 of FIG. 2 subsequently to be described in connection with FIG. 10 where a combination of the real and imaginary components and square law rectification is accomplished.

B. Double Loop Canceller Operation

In operation and with continued reference to FIG. 8, the output signal from the sample and hold circuit 50 appears at the output terminal thereof and is an analog voltage level held constant for a period of 400 nanoseconds duration following each sample. This analog voltage level is converted to a digital word in the analog-to-digital converter 138 after the analog feedback signal from the digital-to-analog converter 174 is subtracted therefrom in the differential operational amplifier 136. The range of discrete voltage levels available from the analog-to-digital converter 13 is ± 2.5 volts in non-linear increments, the smallest being 74.0 millivolts, as shown in the following table:

TABLE V

| Effective Analog Input Volts | A/D Threshold and Value | | Interval Number |
|---|---|---|---|
| 2.500 | ∞ | | |
| | 31.5 | | |
| | 30.5 | | |
| | 29.5 | 28 | 15 |
| | 28.5 | | |
| 2.008 | | | |
| | 27.5 | | |
| | 26.5 | | |
| | 25.5 | 24 | 14 |
| | 24.5 | | |
| 1.717 | | | |
| | 23.5 | | |
| | 22.5 | | |
| | 21.5 | 20 | 13 |
| | 20.5 | | |
| 1.426 | | | |
| | 19.5 | | |
| | 18.5 | | |
| | 17.5 | 16 | 12 |
| | 16.5 | | |
| 1.135 | | | |

TABLE V-continued

| Effective Analog Input Volts | A/D Threshold and Value | Interval Number |
|---|---|---|
| .984 | 15.5 / 14.5 > 14 | 11 |
| .838 | 13.5 / 12.5 > 12 | 10 |
| .691 | 11.5 / 10.5 > 10 | 9 |
| .548 | 9.5 / 8.5 > 8 | 8 |
| .475 | 7.5 > 7 | 7 |
| .401 | 6.5 > 6 | 6 |
| .328 | 5.5 > 5 | 5 |
| .255 | 4.5 > 4 | 4 |
| .185 | 3.5 > 3 | 3 |
| .111 | 2.5 > 2 | 2 |
| .037 | 1.5 > 1 | 1 |
| 0 | 0.5 > 0 | 0 |
| −.037 | −0.5 > 0 | −1 |
| −.111 | −1.5 > −1 | −2 |

A presentment of a new volatge level to the amplifier 136 every 400 nanoseconds is coincident with the loading of the 8-bit digital feedback word from the buffer 172 into the digital-to-analog converter 174, and with the loading of the storage circuit 140. Two clocks or strobbing signals may be used to permit the double loop canceller 56 to accept data when available on the input terminal, and then to resynchronize this data for compatibility with the doppler filter memory timing subsequently to be described. This resynchronization equalizes some of the delay introduced by the hybrid input circuits, and the remainder of the system delay is introduced in the delay circuits 164 and 166 in the feedback circuit to establish synchronization of the 8-bit digital feedback word with the sampled input signal. The total delay through the canceller is 3 range bins of time but this delay is easily accommodated by advancing one of the shift-register memories three times. All calculations performed in the cancellers are thus with data from the same range bin, but calculations for each range bin are separately performed as that particular range bin data is available.

The translator 142 operates to translate the digital output signal of the analog-to-digital converter 138 to a 6-bit binary word in accordance with the following table:

TABLE VI

| Interval Number | Interval Range From | To | A/D Value | Binary Output S | A | B | C | D | E |
|---|---|---|---|---|---|---|---|---|---|
| + 15 | + 27.5 | ∞ | + 28 | 0 | 1 | 1 | 1 | 0 | 0 |
| + 14 | + 23.5 | + 27.5 | + 24 | 0 | 1 | 1 | 0 | 0 | 0 |
| + 13 | + 19.5 | + 23.5 | + 20 | 0 | 1 | 0 | 1 | 0 | 0 |
| + 12 | + 15.5 | + 19.5 | + 16 | 0 | 1 | 0 | 0 | 0 | 0 |
| + 11 | + 13.5 | + 15.5 | + 14 | 0 | 0 | 1 | 1 | 1 | 0 |
| + 10 | + 11.5 | + 13.5 | + 12 | 0 | 0 | 1 | 1 | 0 | 0 |
| + 9 | + 9.5 | + 11.5 | + 10 | 0 | 0 | 1 | 0 | 1 | 0 |
| + 8 | + 7.5 | + 9.5 | + 8 | 0 | 0 | 1 | 0 | 0 | 0 |
| + 7 | + 6.5 | + 7.5 | + 7 | 0 | 0 | 0 | 1 | 1 | 1 |
| + 6 | + 5.5 | + 6.5 | + 6 | 0 | 0 | 0 | 1 | 1 | 0 |
| + 5 | + 4.5 | + 5.5 | + 5 | 0 | 0 | 0 | 1 | 0 | 1 |
| + 4 | + 3.5 | + 4.5 | + 4 | 0 | 0 | 0 | 1 | 0 | 0 |
| + 3 | + 2.5 | + 3.5 | + 3 | 0 | 0 | 0 | 0 | 1 | 1 |
| + 2 | + 1.5 | + 2.5 | + 2 | 0 | 0 | 0 | 0 | 1 | 0 |
| + 1 | + 0.5 | + 1.5 | + 1 | 0 | 0 | 0 | 0 | 0 | 1 |
| + 0 | 0 | + 0.5 | + 0 | 0 | 0 | 0 | 0 | 0 | 0 |
| − 0 | − 0.5 | 0 | − 0 | 1 | 1 | 1 | 1 | 1 | 1 |
| − 1 | − 1.5 | − 0.5 | − 1 | 1 | 1 | 1 | 1 | 1 | 0 |
| − 2 | − 2.5 | − 1.5 | − 2 | 1 | 1 | 1 | 1 | 0 | 1 |
| − 3 | − 3.5 | − 2.5 | − 3 | 1 | 1 | 1 | 1 | 0 | 0 |
| − 4 | − 4.5 | − 3.5 | − 4 | 1 | 1 | 1 | 0 | 1 | 1 |
| − 5 | − 5.5 | − 4.5 | − 5 | 1 | 1 | 1 | 0 | 1 | 0 |
| − 6 | − 6.5 | − 5.5 | − 6 | 1 | 1 | 1 | 0 | 0 | 1 |
| − 7 | − 7.5 | − 6.5 | − 7 | 1 | 1 | 1 | 0 | 0 | 0 |
| − 8 | − 9.5 | − 7.5 | − 8 | 1 | 1 | 0 | 1 | 1 | 1 |
| − 9 | − 11.5 | − 9.5 | − 10 | 1 | 1 | 0 | 1 | 0 | 1 |
| − 10 | − 13.5 | − 11.5 | − 12 | 1 | 1 | 0 | 0 | 1 | 1 |
| − 11 | − 15.5 | − 13.5 | − 14 | 1 | 1 | 0 | 0 | 0 | 1 |
| − 12 | − 19.5 | − 15.5 | − 16 | 1 | 0 | 1 | 1 | 1 | 1 |
| − 13 | − 23.5 | − 19.5 | − 20 | 1 | 0 | 1 | 0 | 1 | 1 |
| − 14 | − 27.5 | − 23.5 | − 24 | 1 | 0 | 0 | 1 | 1 | 1 |
| − 15 | − ∞ | − 27.5 | − 28 | 1 | 0 | 0 | 0 | 1 | 1 |

The analog-to-digital converter 138 has a 6-bit digital output word. However, as earlier stated, the digital-to-analog converter 174 in the feedback path provides an 8-bit digital word. Since the differential operational amplifier 136 receives the analog input signal and the analog feedback signal from the digital-to-analog converter 174 with opposite polarity, the result is a subtraction with a difference value necessarily smaller in magnitude than either of the input signals. The resultant reduction in the range of magnitudes of the analog input signals from the amplifier 136 to the analog-to-digital converter 138 permits expression with six digital bits.

For example, the range of the input signals from the sample and hold circuit 50 is approximatly 48 d.b. and the difference in range in the signal applied to the analog-to-digital converter 138 is approximately 36 d.b. The hybrid approach of the present application thus takes advantage of the reduction of the range of signal magnitude in the construction of the analog-to-digital converter 138.

As has been earlier explained, the ground return signal greatly exceeds that of any airborne target in normal radar conditions. Digital accuracy of 8 bits is thus required to detect the presence of a moving target in the presence of the larger ground return, i.e., variation in the least significant bit represents the moving target when the ground return is held constant. Less than 8 bits would allow the ground return to mask the moving target echoes.

The required capacity of the filter memory to include all the significant data can be reduced by means of a notch filter. The output data from the canceller contains the moving target returns and attenuated ground returns and may be expressd in a 4-bit digital output word.

In the cancellers described supra, the output signal of the phase detectors are sampled for each range bin of the radar signal and, after cancellation, these samples are sent in digital form to the main memory subsequently to be described in connection with FIG. 9.

C. Single Loop Canceller and Operation

The output signal from the double loop canceller of FIG. 8 is applied to the single loop canceller 58 where it is delayed and stored for the synchronous application to the input/output logic circuit 184 in synchronism with the data from the preceding range bin.

With continued reference to FIG. 8, the single loop canceller 58 includes a delay circuit 180, and an input-/output logic circuit 184 connected in series. The input terminal 146 to the single loop canceller 42 is the input terminal of the delay circuit 180 and is also directly connected to the input/output logic circuit 184.

The delay introduced by th delay circuit is one range bin and the data from the next range bin is applied synchronously to the input/output logic circuit 184 and the digital output signal therefrom applied by way of the terminal 186 to the memory 60 of FIGS. 2 and 9.

The single loop canceller 58 may be conventional in circuitry and operation and may be, for example, of the type currently utilized in the AN/APS 96 radar system manufactured by the Control Data Corporation.

D. Memory and Filter Circuits

With reference now to FIG. 9 where the memory circuit 60 of FIG. 2 is illustrated in greater detail, the memory circuit comprises a serially connected main memory synchronization circuit 188, a digital-to-digital converter 190, a storage circuit 192, a multiplexer 194, a digital-to-analog converter 202, and a Chebycheff weighting circuit including resistors 196 and 198.

Synchronization of the memory circuit 46 is conventionally accomplished in the main memory circuit 188 and the 6-bit digital output signal therefrom converted to a 4-bit signal in the digital-to-digital circuit 190. The 4-bit digital signal for each range bin in the immediately preceding 16 radar pulses, together with the currently received signal, are available to the multiplexer 194. Thw multiplexer 194 is conventional and is utilized primarily to reduce the number of wires in the system.

The 17 signals are each converted to analog form in digital-to-analog converter 202 and thereafter weighted in accordance with the well-known Chebycheff polynomial to control the side lobe levels and bandwidth of the doppler filters as a function of the time the individual signals have been stored in the storage circuit 192.

Figure 10:
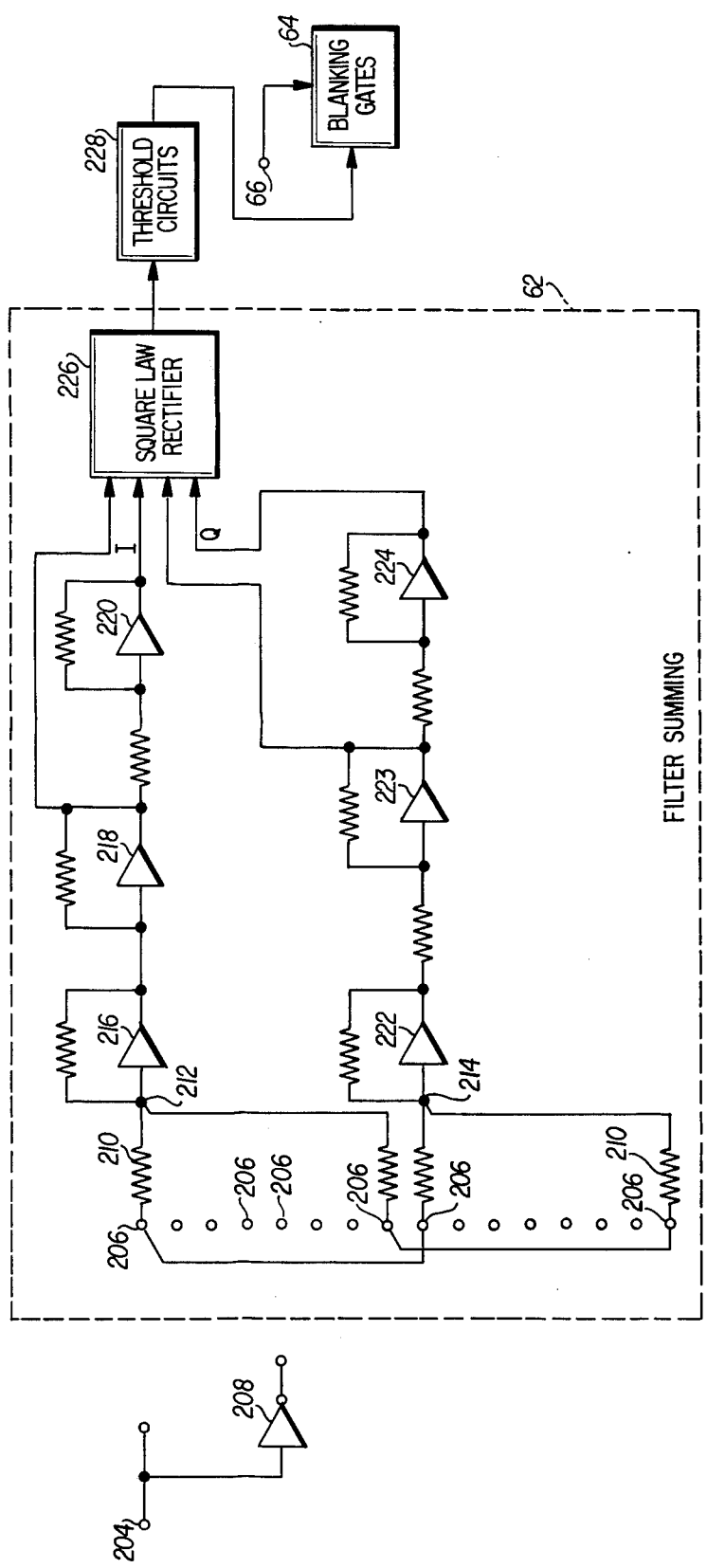
FIG. 10 is a functional block diagram of the filter summing circuit of FIG. 2.

With reference now to FIG. 10, the 34 output signals on the output terminal 204 of the memory 60 of FIG. 9 is applied through a like numbered terminal to selected ones of the several input terminals 206 of the in-phase I and quadrature Q channels of the filter summing circuit 62.

The signal applied to the input terminal 204 is also inverted in polarity in a conventional inverter 208 and applied to selected ones of 34 additional input terminals 206 not shown in FIG. 10 in the interest of brevity.

Each of the terminals 206 is connected by way of a resistor 210 to a summing junction 212 or 214 in the I and Q channels, respectively. The value of the resistors 210 is selected for trigometric weighting in different filters in accordance with sine and cosine functions at different frequencies. Thus, the input signals are added in phase only at a specific frequency. The number of selection of the 34 positive and 34 negative signals is dictated by the characteristics desired of the filter.

With continued reference to FIG. 10, the I or in-phase channel contains three serially connected operation amplifiers 216–220 and the Q or quadrature channel contains three similar operational amplifiers 222, 223 and 224. The output signals I and Q are summed in a square law rectifier 226 and the output signal therefrom applied to one of the 14 threshold detectors 228.

Only those rectified signals exceeding a predetermined noise level are passed by the 14 threshold circuits 228 to the associated one of the 14 blanking gates 64. The blanking gates 64 are responsive to the signals from the side lobe blanking circuit 40 of FIG. 1 as applied via terminal 66 for the $I_4$ channel 30 for gating potential target signals to conventional target discrimination circuitry (not shown), e.g., a 4 out of 7 counter, and to the indicator 38 of FIG. 1.

In operation, the operation amplifier 216 is a summing amplifier, the amplifier 218 is utilized as a buffer and the amplifier 220 serves to invert the signal applied to the square law rectifier 226. The output signal from the buffer amplifier 218 is also applied without inverting to the rectifier 226.

The three amplifiers 222–224 are similar in operation and the square law rectifier effects full wave rectification to thereby prevent loss of signals to the polarity thereof.

ADVANTAGES AND SCOPE OF THE INVENTION

From the foregoing, it is apparent that the present invention provides a heretofore unknown target resolution in MTI systems. First, the sensitivity time control circuit in conjunction with the control of gain on a range bin-by-range bin basis provides a superior input signal to the cancellers from dynamic response considerations. The series combination of double loop and single loop cancellers cooperate uniquely in their hybrid analog and digital circuits to save weight and space. The Chebycheff and trigometric weighting of a large number of signals increase target resolution. The position of main lobe stationary targets of sufficient signal strength to appear as side lobe targets are tracked and the doppler frequency calculated for selective blanking of the filter in which the false target would appear.

Sampling twice permits the present system to operate on a 0.4 microsecond time basis while achieving 0.2 microsecond target resolution, thus effectively doubling the bandwidth. The problems of the same positive and negative doppler frequencies are resolved by the use of the in-phase and quadrature channels.

Moreover, the vector rotation TACCAR technique permits additional simplicity in design and a significant reduction in weight.

Many modifications to the described embodiment of the system may be made without departing from the spirit and essence of the invention. The invention is, therefore, to be limited solely by the language of the appended claims when accorded a full range of equivalents.

What is claimed is:

1. An MTI system comprising:
   a source of pulse radar return signals;
   an indicator;
   a signal processor for processing the radar return signals from said source, said processor including in-phase and quadrature channels each having a blanking gate operative when enabled to apply the processed radar signals to said indicator;

a blanking circuit responsive to the radar return signals from said source for controlling the enabling of said blanking gates; and, means including a resolver and a vector rotator for substantially removing the effects of radar platform from the radar return signals applied to said blanking gates.

2. The system of claim 1 wherein each channel of said signal processor includes a plurality of doppler filters, the center frequency of each of said filters being displaced from the center frequency of each of the other of said filters.

3. The system of claim 2 wherein each of said in-phase and quadrature channels includes two sampling channels, each of said sampling channels including a double loop canceller and a single loop canceller in series.

4. The system of claim 1 wherein each of said in-phase and quadrature channels includes two sampling channels, each of said sampling channels including a double loop canceller and a single loop canceller in series.

5. An MTI system comprising:
a source of pulse radar return signals;
an indicator;
a signal processor for processing the radar return signals from said source, said processor including blanking gates operative when enabled to apply the processed radar signals to said indicator;
a blanking circuit responsive to the radar return signals from said source for controlling the enabling of said blanking gates; and,
means including a resolver and vector rotator for substantially removing the effects of radar platform from the radar return signals applied to said blanking gates.

6. The system of claim 5 including means for resolving quadrant ambiguity.

7. The system of claim 5 wherein said resolver includes digital sine and cosine memories; and,
wherein said rotator includes means for multiplying a digital signal from one of said memories by an analog radar return signal.

8. The system of claim 7 wherein said multiplying means are four in number whereby the sine and cosine valuer of in-phase and quadrature radar return signals may be produced; and,
wherein said rotator further includes means for producing an analog signal related to the difference between the signals produced by pairs of said multiplying means.

9. The system of claim 8 including means for resolving quadrant ambiguity.

10. A method of removing the effects of radar platform movement from a doppler radar signal comprising the steps of:
a. generating an electrical signal related to the angle of the radar antenna relative to a predetermined reference;
b. resolving the angle related electrical signal into sine and cosine related signals;
c. sampling the radar signal in-phase and in quadrature;
d. multiplying both the in-phase and quadrature sampled radar signals by both the sine and cosine related signals to provide four product related signals;
e. combining the product of the in-phase and sine related signals with the product of the quadrature and cosine related signals to provide a first combined signal;
f. combining the product of the in-phase and cosine related signals with the product of the quadrature and sine related signals to produce a second combined signal; and,
g. selectively combining the first and second combined signals.

11. A method of processing a doppler radar signal comprising the steps of:
a. periodically sampling the radar signals from a plurality of pulses;
b. removing the effects of radar platform movement from the signal samples;
c. discriminating against signal samples varying more than a predetermined amount from the corresponding signal sample from a preceding pulse;
d. weighting the signal samples in accordance with the Chebycheff polynomial;
e. trigometrically weighting the Chebycheff polynomial weighted signal samples;
f. square law rectifying the weighted signal samples; and,
g. applying the rectified signal samples over a predetermined value to an indicator.

* * * * *